United States Patent
Bell (10) Patent No.: US 7,722,307 B2
(45) Date of Patent: May 25, 2010

(54) SYSTEM AND METHOD FOR HANDLING STOCKED ITEMS

(75) Inventor: Steven G. Bell, McKinney, TX (US)

(73) Assignee: Daifuku America Corporation, Salt Lake City, UT (US)

( * ) Notice: Subject to any disclaimer, the term of this patent is extended or adjusted under 35 U.S.C. 154(b) by 274 days.

(21) Appl. No.: 10/933,946

(22) Filed: Sep. 3, 2004

(65) Prior Publication Data

US 2006/0051187 A1     Mar. 9, 2006

(51) Int. Cl.
*B65G 1/04*     (2006.01)

(52) U.S. Cl. .................. 414/268; 414/278; 414/807; 700/216; 198/718

(58) Field of Classification Search ............ 414/267, 414/274, 276, 278, 286, 807, 331.15, 331.16, 414/268; 198/347.2, 347.4, 718; 700/216
See application file for complete search history.

(56) References Cited

U.S. PATENT DOCUMENTS

| | | | | | |
|---|---|---|---|---|---|
| 2,661,100 | A | * | 12/1953 | Ashford | 414/331.16 |
| 2,808,946 | A | * | 10/1957 | Just et al. | 198/347.4 |
| 3,122,231 | A | * | 2/1964 | Pence et al. | 198/347.4 |
| 3,173,557 | A | * | 3/1965 | Eliassen | 198/347.4 |
| 3,417,879 | A | * | 12/1968 | Gough | 414/281 |
| 3,620,348 | A | * | 11/1971 | Kursinczky | 198/464.3 |
| 3,744,621 | A | * | 7/1973 | Adams et al. | 414/294 |
| 4,385,859 | A | * | 5/1983 | Goossens | 414/267 |
| 4,542,808 | A | * | 9/1985 | Lloyd, Jr. et al. | 186/56 |
| 5,115,907 | A | * | 5/1992 | Pomara, Jr. | 198/744 |
| 5,141,382 | A | * | 8/1992 | Naumanen | 414/276 |
| 5,810,154 | A | * | 9/1998 | Brouwer et al. | 198/718 |
| 6,357,985 | B1 | * | 3/2002 | Anzani et al. | 414/331.05 |
| 6,843,632 | B1 | * | 1/2005 | Hollander | 414/276 |
| 6,877,943 | B2 | * | 4/2005 | Lehrieder et al. | 414/278 |
| 7,101,138 | B2 | * | 9/2006 | Fosnight et al. | 414/222.11 |
| 7,110,855 | B2 | * | 9/2006 | Leishman | 700/216 |
| 7,363,104 | B2 | * | 4/2008 | Stevens | 700/213 |
| 2004/0247421 | A1 | * | 12/2004 | Saunders et al. | 414/500 |

* cited by examiner

*Primary Examiner*—James Keenan
(74) *Attorney, Agent, or Firm*—Wood, Phillips, Katz, Clark & Mortimer (57) ABSTRACT

A system for controlling stocked items to be picked in a warehouse. The system has a first support assembly upon which a plurality of items can be stored in a predetermined array, including a plurality of rows, and from which stored items can be picked from a first location. The first support assembly has at least (a) a first state with no item upon the first support assembly, (b) a second state with at least one item in at least one of the rows and no items in another of the rows and (c) a third state with at least one item in each of the plurality of rows. The system includes a repositioning assembly that is operable to cause an item upon the first support assembly to be shifted from a first position in a first row to a second position in a second row. An item upon the first support assembly is situated to be more accessible to an operator for picking from the first location with the item in the second position than with the item in the first position. The system further includes a controller through which the repositioning assembly is selectively operated.

24 Claims, 9 Drawing Sheets

SYSTEM AND METHOD FOR HANDLING STOCKED ITEMS

BACKGROUND OF THE INVENTION

1. Field of the Invention

This invention relates to systems through which items are bulk stored and from which items can be selectively picked through single order and/or batch picking operations. The invention is also directed to a method of handling stocked items to be picked, as by using the above system.

2. Background Art

Myriad systems currently exist to bulk store products in warehouses and from which items can be coordinatingly picked to fill orders. Designers of these systems strive principally to, among other things, make them both safe and efficient.

It is known to store case quantities of items/products for picking on pallets. Pallets offer the convenience that they can be transported through conventional forklifts, or other equipment, to and around a warehouse. The pallets, with the stacked cases thereon, can be strategically maneuvered within a warehouse to facilitate efficient picking. The pallets may be located directly upon a floor surface or, as is more common, placed upon shelving at vertically and/or horizontally spaced locations to be accessible within a picking zone, or multiple picking zones.

While pallets lend themselves to convenient handling within a warehouse, they have some inherent limitations. A single pallet is generally loaded with cases, each containing the same type and quantity of items, and therefore having the same outside shape and size. The cases may be arranged in a single layer or multiple, vertically spaced layers. Typically, the cases are arranged in squared arrays with linear columns of items extending between the front and rear of the pallet, and transverse linear rows of items extending between the sides of the pallet. The operator will normally pick cases from the top and front and work down and back towards the rear of the pallet.

While the cases can be conveniently accessed at the front of the pallet, the picking progression requires the operator to reach back further towards the rear of the pallet to access the remaining cases, as the cases in each row are fully picked. Depending upon the dimensions of the pallet, accessing of cases in the rear rows thereof may represent a significant inconvenience. By reaching towards the rear of the pallet, the operator may be precariously postured so that he/she is prone to injury, particularly if the weight of the cases is substantial. Even if the cases are each light in weight, the need to have to reach to the rear of the pallet represents an inconvenience and a potential compromise in efficiency. With a relatively large pallet, the operator may be required to physically walk over or around the pallet to access the case contents at the rear thereof. Aside from this inconvenience, the operator again may be prone to injury by reason of having to walk over and round the pallets and contents thereof to gain access to the case, or cases, to be picked.

This problem is further aggravated in warehouse environments in which the case carrying pallets are loaded upon one or more vertically elevated shelves. While the frontmost cases may be accessed without any difficulty, the operator may be required to use ladders, or to climb upon the upper shelving, to gain access to the cases in the intermediate and rear rows. The elevated shelving adds another dimension to both the inconvenience and the potential danger to operators accessing the cases on the pallets thereon.

Still further, the upper shelving represents a potential impediment to maneuvering around the pallets therebelow to access the cases on the lower shelving. The operator may be required to bend over to avoid hitting his/her head upon the upper shelving. Unintended contact between operators and the shelving structure is inevitable. Further, by reason of being hunched over, the operator is in an inappropriate lifting position. Further, maneuvering in this position is relatively time consuming compared to maneuvering in an upright position.

Aside from the reduction in efficiency, and the potential inconvenience and dangers associated with these types of conventional systems, operators working in this environment are more subject to becoming fatigued. As fatigue sets in, efficiency generally decreases. Further, these environments may become less attractive to competent workers, making more difficult the process of hiring of qualified individuals to man these warehouses.

SUMMARY OF THE INVENTION

In one form, the invention is directed to a system for handling stocked items to be picked in a warehouse. The system has a first support assembly upon which a plurality of items can be stored in a predetermined array, including a plurality of rows, and from which stored items can be picked from a first location. The first support assembly has at least (a) a first state with no item upon the first support assembly, (b) a second state with at least one item in at least one of the rows and no items in another of the rows and (c) a third state with at least one item in each of the plurality of rows. The system includes a repositioning assembly that is operable to cause an item upon the first support assembly to be shifted from a first position in a first row to a second position in a second row. An item upon the first support assembly is situated to be more accessible to an operator for picking from the first location with the item in the second position than with the item in the first position. The system further includes a controller through which the repositioning assembly is selectively operated.

In one form, the repositioning assembly has a pusher assembly for moving an item relative to the first support assembly from the first position into the second position.

The controller may be manually operated to cause an item to be moved from the first position into the second position through the repositioning assembly.

The system may further include a sensing assembly capable of sensing at least one of the states of the first support assembly and generating a signal that is indicative of at least one of the states to the controller for processing by the controller.

The repositioning assembly may include a pusher that is movable from a first position into a second position to thereby cause an item to be moved from the first position for the item into the second position for the item.

In one form, the sensing assembly is capable of sensing the first state for the first support assembly and for generating a signal to the controller that causes the repositioning assembly to be operated to move the pusher into its first position.

In one form, with items stored to capacity in the predetermined array, an item is in a most proximal row relative to the first location and an item is in a most distal position row to the first location. With the sensing assembly sensing that the first support assembly is in a state wherein there is at least one item upon the first support assembly but no item in the most proximal row, the sensing assembly causes a signal to be generated to the controller to cause the repositioning assembly to be operated to thereby move an item into the most proximal row.

In one form, with items stored to capacity in the predetermined array, an item is in a most proximal row relative to the first location, an item is in a most distal row relative to the first location, and at least one item is in an intermediate row between the most proximal and most distal rows. With the sensing assembly sensing that the first support is in a state wherein there is at least one item in a first intermediate row and no item in the most proximal row, the sensing assembly causes a signal to be generated to the controller to cause the repositioning assembly to be operated to thereby move an item in the first intermediate row into the most proximal row.

In one form, the item in the first intermediate row is caused to be moved from the first intermediate row into the most proximal row by at least one of (a) repositioning an item in the most distal row and (b) repositioning an item in a second intermediate row between the first intermediate row and the most distal row.

In one form, the repositioning assembly has a movable pusher that bears against items upon the first support assembly.

The pusher may be operated by at least one hydraulic or pneumatic cylinder.

The system may be provided in combination with at least one item on the first support assembly.

In one form, the first support assembly has a surface upon which items are supported that is substantially flat and horizontally oriented.

The items may be arranged substantially linearly in columns in the predetermined array so that items moving in a column travel in a linear path through the plurality of rows.

The system may further include a second support assembly adjacent to the first support assembly and upon which a plurality of items can be stored and from which items can be picked from a second location that is adjacent to the first location.

The first location may be above the second location.

Alternatively, the first location is horizontally spaced from the second location.

The second support assembly may have substantially the same structure as the first support assembly.

In one form, the first and second support assemblies cooperatively define a picking station and the system further has an accumulation system for consolidating items picked from the first and second support assemblies.

Structure may be provided to identify for an operator items that are to be picked from the first and second support assemblies to the accumulation system.

The accumulation system may include a conveyor.

The invention is further directed to a method of handling stocked items to be picked in a warehouse. The method includes the steps of: providing a first support assembly upon which a plurality of items can be stored in a predetermined array and from which stored items can be picked from a first location; and moving at least one item in the predetermined array from a first position into a second position as an incident of one or more items being removed from the predetermined array. An item upon the first support assembly is situated to be more accessible to an operator for picking from the first location with the item in the second position than with the item in the first position.

The method may further include the step of providing a repositioning assembly that is operable to cause an item to be moved from the first position into the second position. The step of moving at least one item may involve the step of operating the repositioning assembly.

The step of providing a repositioning assembly may involve providing a repositioning assembly that has a pusher assembly.

The step of operating the repositioning assembly may involve operating the repositioning assembly to cause the pusher assembly to bear against and move an item upon the first support assembly.

The step of operating the repositioning assembly may involve manually operating the repositioning assembly.

The predetermined array may include a plurality of rows of items. The method may further include the step of providing a sensing assembly for sensing the state of the first support assembly that is at least one of (a) a first state with no item upon the first support assembly, (b) a second state with at least one item in at least one of the rows and no items in another of the rows, and (c) a third state with at least one item in each of the plurality of rows, and for generating a signal that is indicative of the at least one state.

The method may further include the step of providing a controller through which the repositioning assembly is operated. The method may further include the step of causing the repositioning assembly to be operated in response to a signal generated by the sensing assembly to the controller.

The step of causing the repositioning assembly to be operated may involve causing the repositioning assembly to be operated in a manner that is dictated by the state of the first support assembly.

The method may further include the steps of providing a second support assembly, which is substantially the same as the first support assembly, and selectively consolidating picked items from the first and second support assemblies.

The method may further include the step of identifying for an operator items to be picked from the first and second support assemblies to fill an order.

The step of causing the pusher assembly to bear against and move an item may involve hydraulically or pneumatically actuating the pusher assembly.

The method may further include the step of placing items directly upon the first support assembly without an underlying pallet.

The method may further include the steps of transporting items to the first support assembly on a pallet and transferring items off of the pallet to the first support assembly.

DETAILED DESCRIPTION OF THE DRAWINGS

Figure 1:
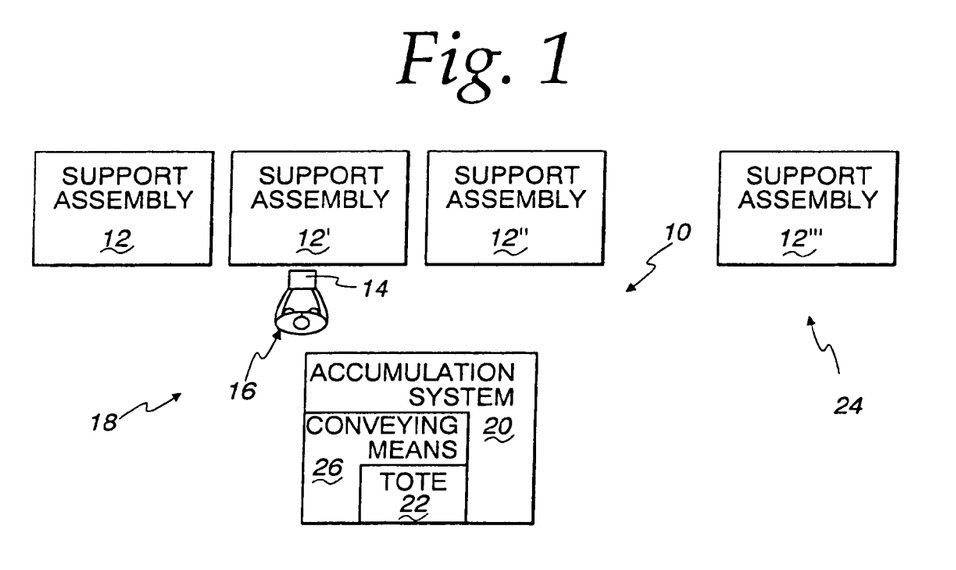
FIG. 1 is a schematic representation of a system for handling stocked items to be picked in a warehouse, according to the present invention, and including a plurality of main support assemblies from which items can be picked to an accumulation system.

In FIG. 1, a schematic representation of a system for handling stocked items, according to the present invention, is shown at 10. The system 10 is typically used in a warehouse environment. In this schematic representation, at least one, and in this case four, main support assemblies 12, 12', 12", 12''' are shown. Upon each support assembly 12, 12', 12", 12''', a plurality of items 14 are stored in a predetermined array. An operator 16, assigned to a first station/zone 18, manually and strategically picks the items 14 from the support assemblies 12, 12', 12" at the first zone 18, to fill a particular order. Of course, automated picking is contemplated by the invention. The picked items 14 are consolidated in an accumulation system 20, which may include, for example, one or more totes 22. An entire order may be picked to the accumulation system 20 entirely at the first zone 18. Alternatively, picks may be consolidated from multiple zones. In this embodiment, the totes 22 can be directed towards the support assembly 12''' in a second zone 24, at which additional items may be picked to fill a particular order. The accumulation system 20 may include a conveyor/conveying means 26, upon which the totes 22 are placed and moved between the zones 18,24, and ultimately to an end location at which the order, including the items in the totes 22, are appropriately processed. The conveying means 26 may be a belt, a pallet on a fork lift, a cart, or the like. Alternatively, the order may be processed in the zone 18 without relocating the tote(s) 22.

The system 10 is intended to be generic in nature as only a representative environment for the present invention. The invention is not limited to any specific configuration of system, nor to specific components, as shown in FIG. 1. The invention can be used in any environment in which items 14 are serially picked from stock to process orders. The invention will be described hereinbelow with respect to items 14 that are in case form. However, this particular configuration of item is exemplary in nature only, and not required.

Figure 2:
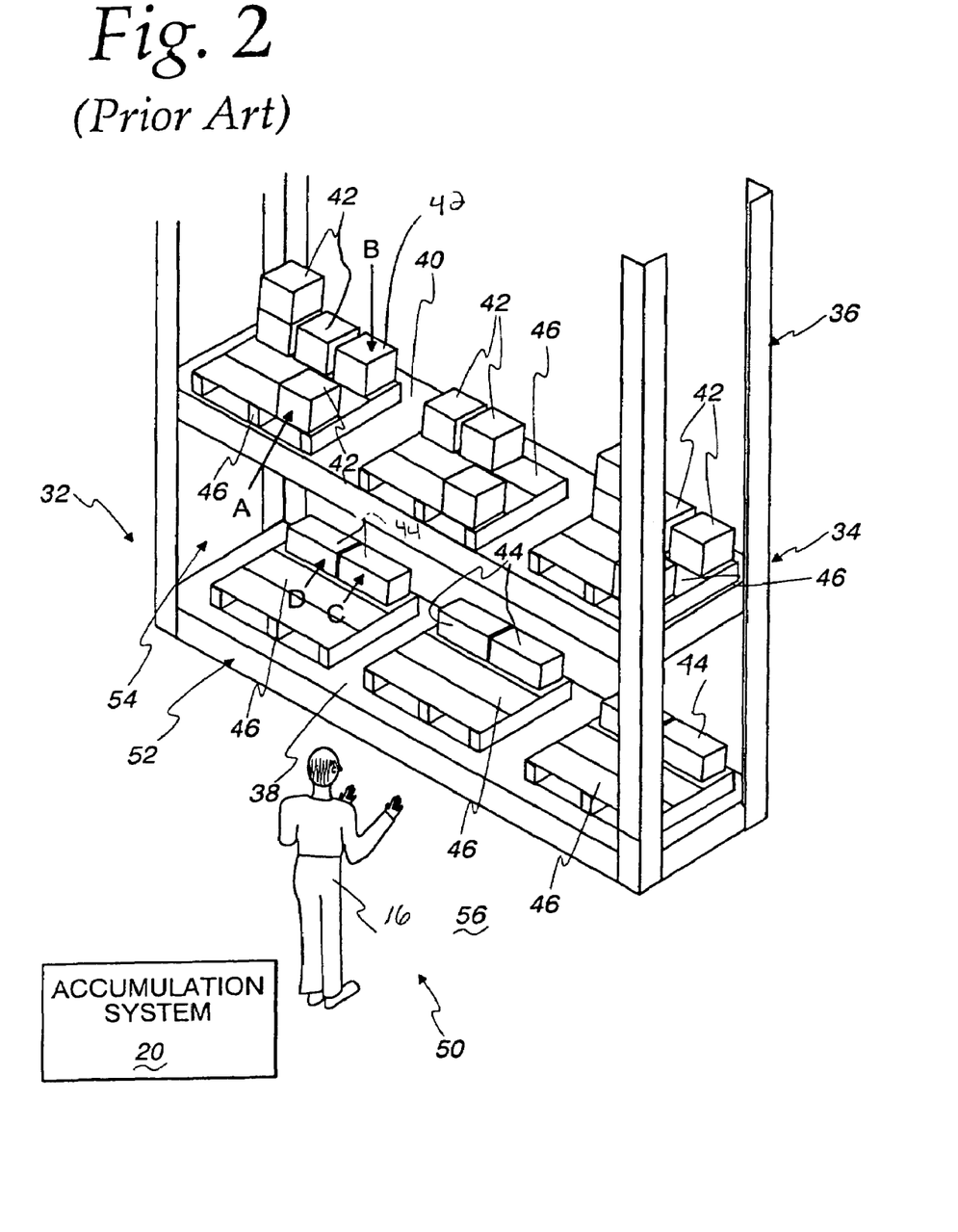
FIG. 2 is a fragmentary, perspective view of a prior art support assembly, corresponding to those shown in FIG. 1, from which an operator picks items to an accumulation system.

Before explaining the details of the inventive system, a conventional system for handling stocked items, over which the present invention improves, will be described with respect to FIG. 2. In FIG. 2, an exemplary, conventional system for handling stocked items is shown at 32. The system 32 has a support assembly at 34 consisting of a frame 36 which supports a lower shelf 38 and an upper shelf 40. Case items 42,44, of different size, are stacked upon pallets 46. The pallets 46, pre-loaded with the case items 42,44, can be delivered, as by a forklift, to each of the shelves 38,40, for temporary placement thereon to facilitate picking of the case items 42,44 therefrom. Typically, the contents of the case items 42, 44 will be the same on each pallet 46, and different, from one pallet 46 to the next. An operator 16, in a zone 50, selectively picks the case items 42, 44, as dictated by a particular order, from all of the pallets 46 on the shelves 38,40. The operator 16 picks from the location at the front 52 of the support assembly 34. In this case, the user 48 will pick the case items 42,44 to an accumulation system 20, as previously described. In the system shown, the user 48 will pick from six different active pallet locations.

For purposes of convenience and efficiency, the operator 16 will typically pick case items 42,44 on each pallet 46 progressively from front to rear. The operator 16 is free to maneuver in front of the support assembly 34 in close proximity to the fronts of each of the pallets 46 within the zone 50. In this embodiment, the upper shelf 40 is vertically situated so that the operator 16 can access the case items 42 at the front of the pallets 46 on the upper shelf 40 without the requirement of any assist item, such as a step or a ladder. For example, the operator 16 may reach upwardly and grasp the container 42 shown at the front location at A on the pallet 46 on the upper shelf 40 and in the leftmost position in FIG. 2.

In the system 32, each pallet 46, with a full complement of case items 44, 44, has the case items 42,44 stacked three deep from front to rear, in two and three laterally spaced columns, respectively, extending from front to rear. As the supply of case items 42,44 at the front region of the pallets 46 is exhausted on the upper shelf 40, the operator 16 is required to reach over the shelf and back, as to the case item 42 shown at B. Depending upon the overall system dimensions, the operator 16 may have to climb up on the upper shelf 40, or use a ladder, to allow him/her to reach back sufficiently to engage the case item 42 at the location B, or otherwise in the back region of the pallet 46.

On the lower shelf 38, access to the rearwardly located case items 44, as shown at C and D, may require that the operator 16 move to within the space 54, between the upper and lower shelves 40,38, respectively. If the case items 42 on the upper shelf 40 are to remain accessible to the operator 16 without a ladder, the upper shelf 40 must generally be at, or below, the height of the operator 16 from the underlying floor surface 56. As a result, for the operator 16 to move within the space 54, he/she must bend over and move carefully within the space 54 to reach the items located at C and D. As previously mentioned, the operator 16 risks hitting his/her head on the upper shelf 40 in this process. Further, by reason of being hunched over to navigate within the space 54, the operator 16 is situated in less than an optimal lifting position, which may be a problem particularly in the event that the case items 44 are of any appreciable weight. Further, the repetitive bending and regular movement in a hunched position produces progressive fatigue and, in a worse case, potential back problems that could become chronic.

Alternatively, the operator 16 can maneuver around towards the back of the support assembly 34 to access the case items 42,44 at the rear regions of the pallets 46. However, producing a space around the support assembly 34, which makes this possible, results in an inefficient use of floor space. Further, while the operator 16 is allowed to maintain an upright stance, he/she is required to travel in a manner that takes a substantial amount of time that, aside from inconvenience, may ultimately contribute to fatigue.

Once the supply of case items 42,44 on a particular pallet 46 is exhausted, a forklift, or other equipment, is utilized to remove the empty pallet 46 and replace the same with a pallet 46 loaded with a new supply of case items 42,44. Thus, handling of pallets 46 must be contended with in the system 32. Additionally, the pallets 46 have a vertical extent of several inches that accounts for elevation of the case items 42,44 from their associated shelf 38,40. The pallets 46 thus take up otherwise usable space and, particularly in the case of the upper shelf 40, undesirably elevate the case items 42 to make them less accessible to the operator 16.

Details of the inventive system 10 are shown in FIGS. 3-13. The exemplary, aforementioned, main support assembly 12 has a frame 62 supporting an upper shelf 64 and a lower shelf 66. The shelves 64,66 correspond in structure and function to the shelves 38,40, shown in the conventional system 32. The case items 42, shown on each shelf 64, 66 with the same configuration for purposes of simplified explanation herein, are stored in a squared array of rows, columns, and layers on each of the shelves 64,66. The operator 16 picks the case items 42 from the shelves 64,66 to the accumulation system at 20. In this case, the accumulation system 20 consists of a manually operable truck 68, with forks 70,72 penetrating a series of pallets 46, upon which the case items 42 can be stacked for transportation to an appropriate processing location.

Figure 3:
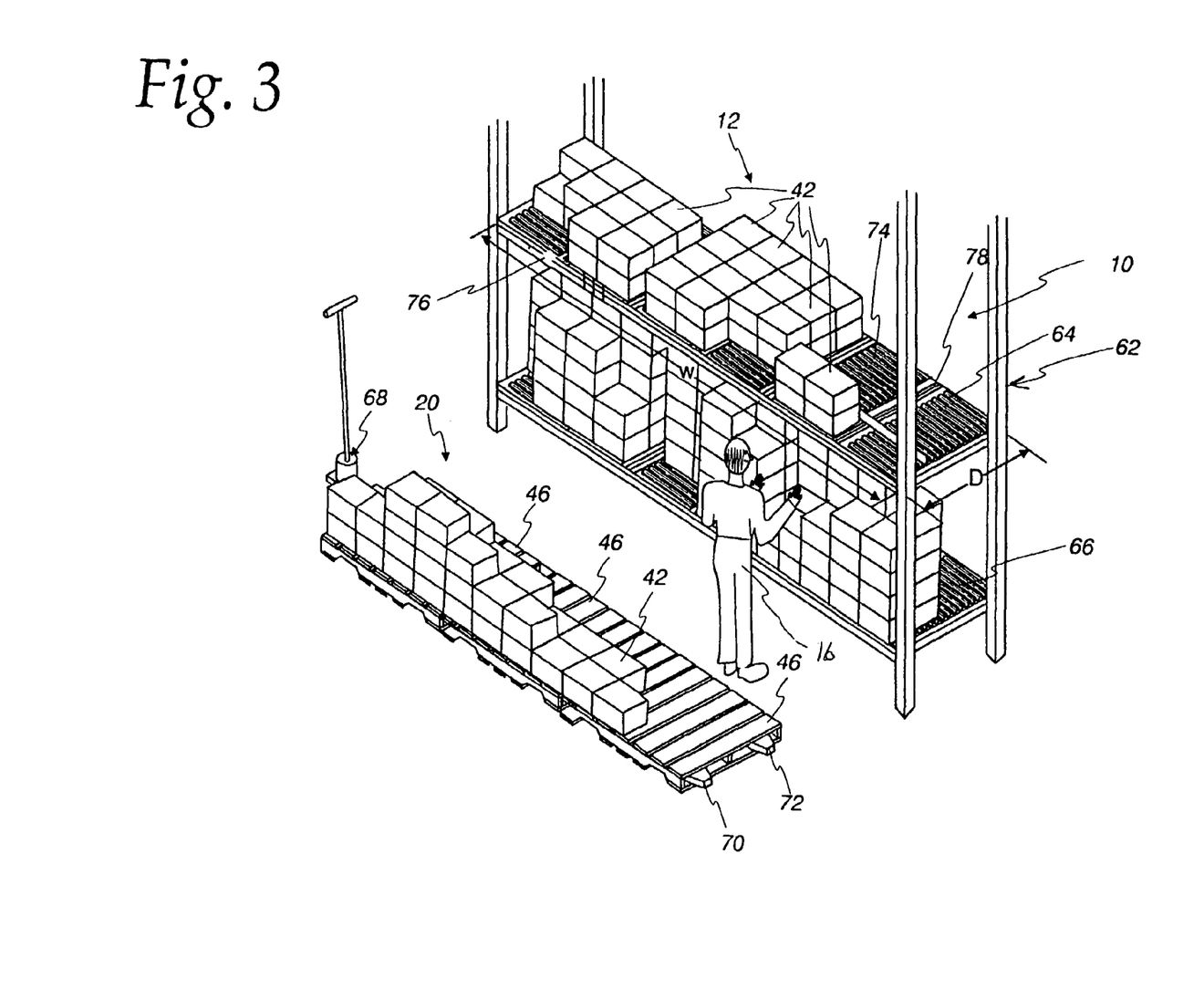
FIG. 3 is a view as in FIG. 2 showing the inventive main support assembly of FIG. 1 with two shelves having secondary support assemblies from which the operator picks to an accumulation system.

In this embodiment, the upper shelf 64 and lower shelf 66 have the same general construction. Exemplary upper shelf 64 has a horizontally extending, substantially flat surface 74 upon which the case items 42 are stored in a predetermined array. In this embodiment, the upper shelf 64 has an overall rectangular shape, with a longer dimensioned width W and a depth D between the front 76 and rear 78 of the flat surface 74.

Figure 4:
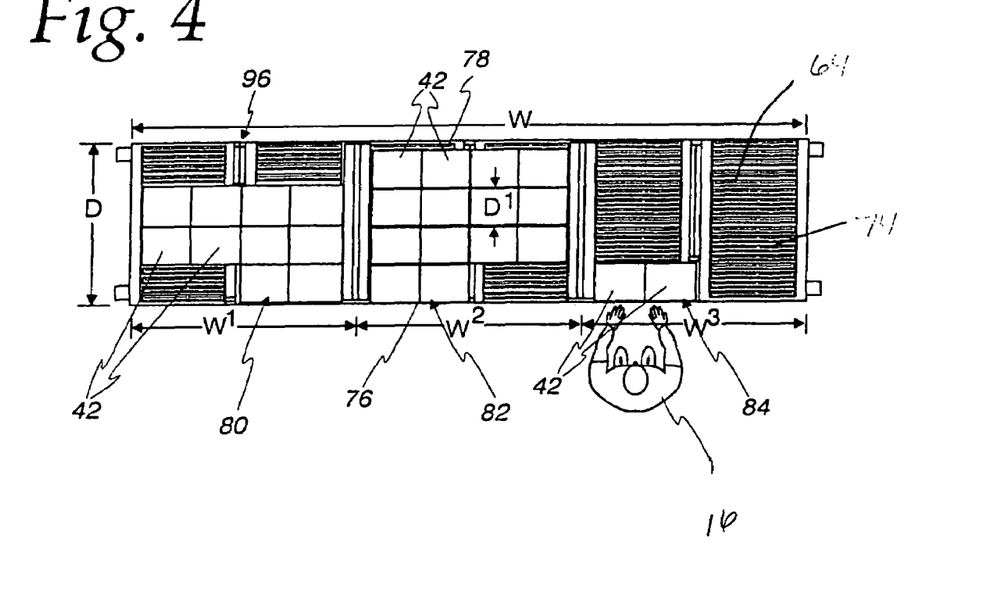
FIG. 4 is a plan view of one of the shelves on the main support assembly in FIG. 3, including three secondary support assemblies.
Figure 5:
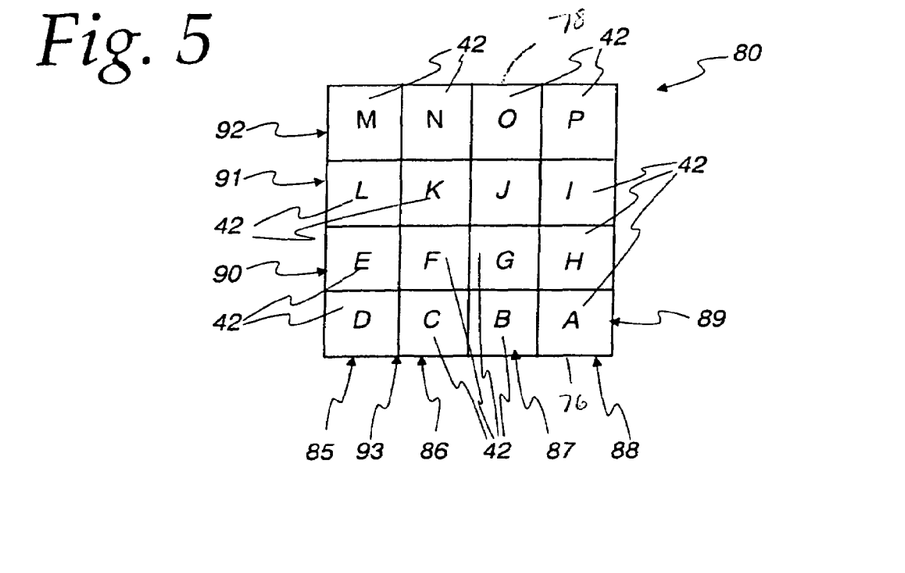
FIG. 5 is a schematic, plan view of one of the secondary support assemblies on the shelf in FIG. 4 and with a 4×4 array of items stored thereon.
Figure 6:
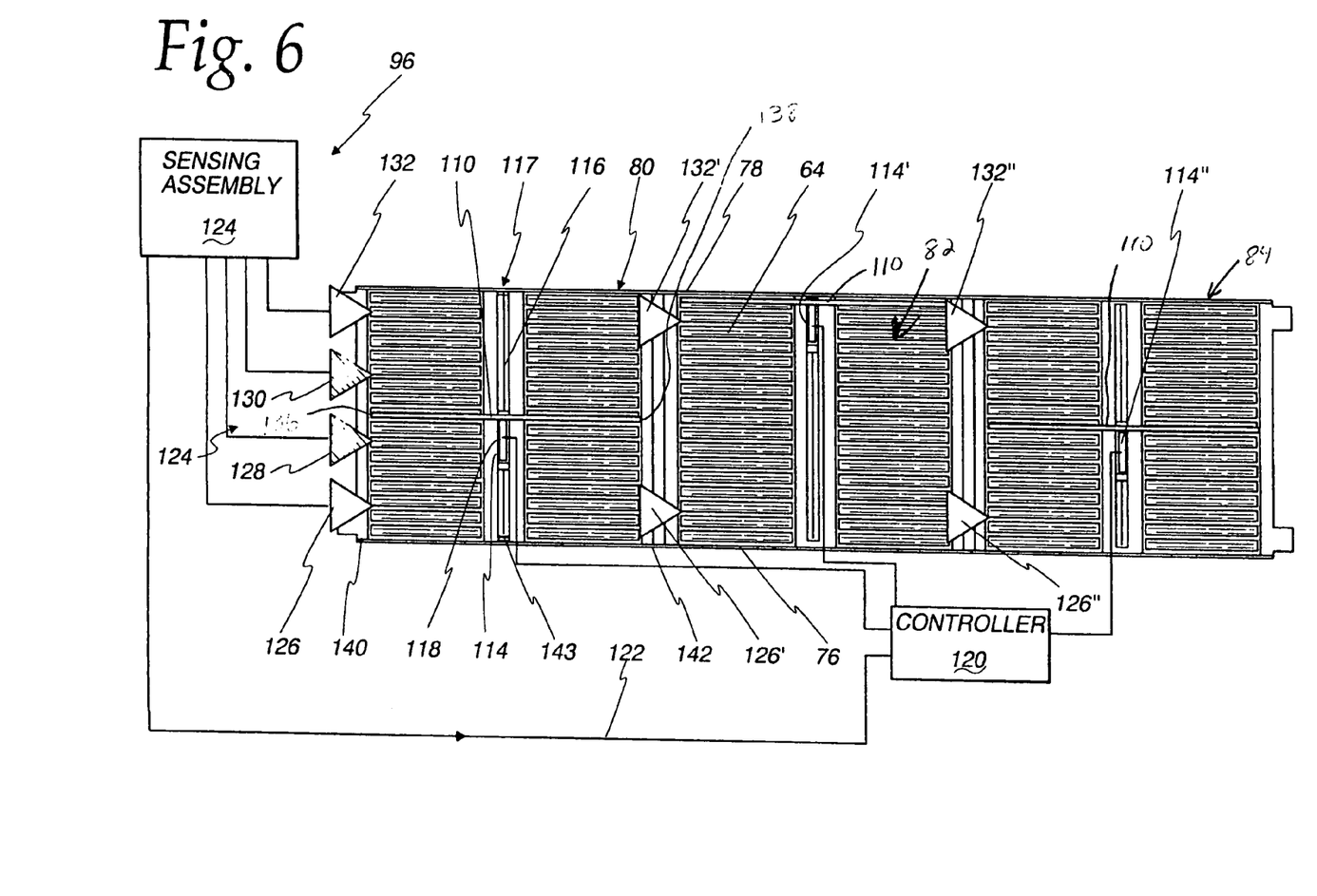
FIG. 6 is an enlarged view as in FIG. 4 showing a sensing assembly and controller in schematic form for actuating pushers on the secondary support assemblies.
Figure 7:
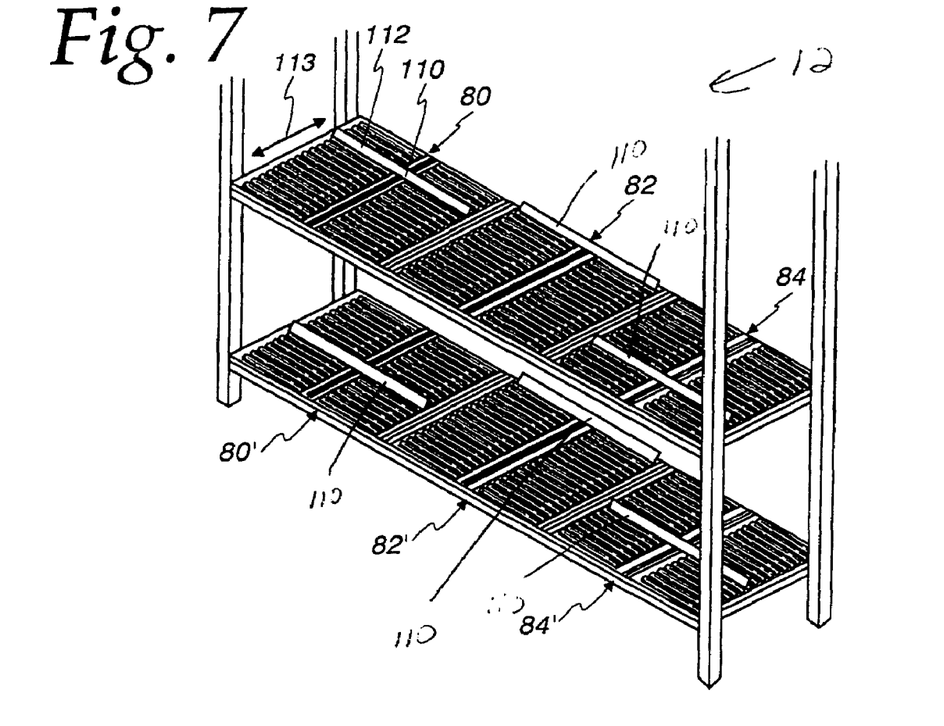
FIG. 7 is a view as in FIG. 3 with no items on the shelves.

According to the invention, the width W is divided to define three laterally spaced, secondary support assemblies 80,82, 84, having widthwise dimensions W1,W2,W3, consecutively. This number is exemplary only. The number of secondary support assemblies may be less than, or greater than, three. Typically, two or three secondary support assemblies are utilized. The support assemblies 80,82,84 have the same general construction, but may have different depth and width dimensions.

Exemplary support assembly 80 is capable of accommodating a 4×4 array of case items 42. The 4×4 array is likewise exemplary only. The particular array will vary based upon the size and shape of the case items 42. In FIG. 4, a single layer of the case items 42 is shown. However, two layers, as shown on the upper shelf in FIG. 2, or additional layers of the case items 42, as shown on the lower shelf 66 in FIG. 3, may be stocked. For purposes of simplifying the explanation herein, the support assembly 80 will be described with a single layer of the case items 42 thereon.

The depicted array of case items 42 includes four side-by-side columns 85, 86, 87, 88 of case items 42, extending between the front 76 and rear 78 of the surface 74. The 4×4 array of case items 42 causes four of the case items 42, at A,B,C,D (FIG. 5), to be situated immediately in the front row 89 of four laterally extending rows 89, 90, 91, 92, spaced from each other in a front to rear direction. The case items 42 positioned in the front row 89, that is most proximal to the operator 16 at a front pick location 93 for the support assembly 80, are readily accessible to the operator 16. The case items 42 at E, F, G, H in the intermediate row 90, immediately behind the row 89, are less accessible by reason of the fact that the operator 16 has to lean over the space previously occupied by the case items 42 at A, B, C, D to access the case items at E, F, G, H. The case items 42 in the next intermediate row 92 at I, J, K, L, and in the rearmost row at M, N, O, P, that is most distal to the pick location 93, are progressively more difficult to access by reason of there being a further front-to-rear space which the operator 16 must reach over to effect a pick.

According to the invention, a repositioning assembly at 96 is provided and is operable to cause a case item 42 in one of the rows 89, 90, 91, occupied by case items A,B,C,D; E,F,G, H; and I,J,K,L, consecutively, to be shifted forwardly in one or more increments corresponding to the fore-and-aft dimension D1 (FIG. 4) of the case items 42.

Figure 8:
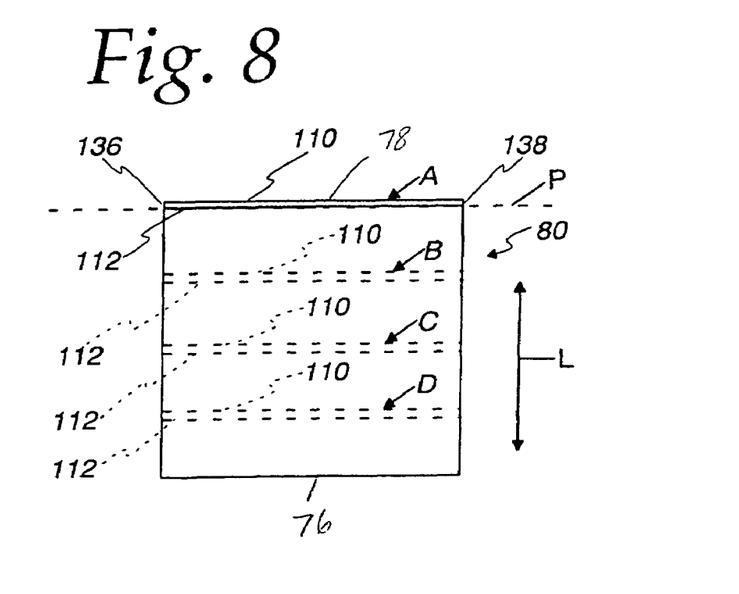
FIG. 8 is a schematic, plan representation of one of the secondary support assemblies showing different positions for a pusher.

The repositioning assembly 96 includes pushers 110, associated, one each, with a support assembly 80, 82, 84, that are translatable forwardly from a first, loading position, shown at A in FIG. 8, incrementally, consecutively to positions B, C and D. The spacing between the positions A,B; B,C; and C,D is approximately the same and equal to the fore-and-aft dimension D1 for the case items 42. Each pusher 110 has a pushing surface 112 that is generally flat and resides in a plane (P—FIG. 8) that is substantially orthogonal to a fore-and-aft line in which the case items 42 are translated, as indicated by the double-headed arrow 113 in FIG. 7. Each pusher 110 is movable back and forth in a path that is substantially parallel to the line L.

The pusher 110 on the support assembly 80 is operatively connected with an hydraulic or pneumatic cylinder 114. An extendable rod 116 on the cylinder 114 is connected to the upper shelf 64 at a location at 117 adjacent to the rear 78 thereof. The main body 118 of the cylinder is connected to the pusher 110 to follow movement thereof. By operating the cylinder 114, the rod 116 is caused to extend, as an incident of which the cylinder body 118 and associated pusher 110 move progressively towards the front 76 of the upper shelf 64. The invention also contemplates use of a rodless cylinder arrangement.

The hydraulic/pneumatic cylinder 114 is operated by a controller 120. The controller 120 responds to a signal 122 generated by a sensing assembly 124. The sensing assembly 124 has the ability to detect several different states for each support assembly 80, 82, 84. The first state exists with no case item 42 upon the support subassembly 80. A second state exists with one or more case items 42 in one of the rows 89, 90, 91, 92 and no case items 42 in another of the rows 89, 90, 91, 92. A third state exists with at least one case item 42 in each of the plurality of rows 89, 90, 91,92, as when case items 42 are stored to capacity on the support assembly 80. The sensing assembly 124 is capable of producing a signal indicative of at least each of these different states.

In response to the sensing assembly 124 detecting that no case item 42 is on the support subassembly 80, a signal is generated to the controller 120 to cause the hydraulic/pneumatic cylinder 114 to operate to retract the rod 116. This causes the pusher 110 to move to the first, loading position, shown at A in FIG. 8. In the event that the sensing assembly 124 detects the presence of one or more case items 42 in the front row 89, no operating signal is produced to the controller 120 to change the state of the hydraulic/pneumatic cylinder 114. In the event that the sensing assembly detects that there is no case item 42 in the front row 89, but a case item 42 in one of the rows 90, 91, 92 therebehind, a signal is generated to the controller 120 to cause operation of the hydraulic/pneumatic cylinder 114 to advance the pusher 110 from the rear towards the front of the upper shelf 64.

The pusher surface 112 is designed with a sufficient widthwise span to engage an upwardly extending surface on each of the four case items 42 in each row 89, 90, 91, 92. As the pusher 110 advances forwardly, the case items 42 in the rearwardmost row 92 are advanced simultaneously in a forward direction therewith. The pusher 110 is preferably advanced incrementally forwardly until at least one case item 42 is situated in the first row 89 at the front of the shelf 64.

The invention is not limited to a specific construction for the sensing assembly 124. In one form, the sensing assembly 124 includes four sensors 126, 128, 130, 132, which may be photoelectric sensors, associated one each with the rows 89, 90, 91, 92, that monitor a region above the shelf surfaces that support the items to thereby detect the presence or absence of items. If the sensor 126 detects that no case item 42 is present in the front row 89, a signal is generated to the controller 120 to advance the pusher 110 in a forward direction. This forward movement may be done continuously, or incrementally, until the sensor 126 detects the presence of a case item 42 in the row 89.

In a basic form, the sensing assembly 124 may include just the forward and rear sensors 126,132. With a full complement of case items 42 loaded on the support assembly 80, and the pusher 110 in the first, loading position, the presence or absence of the case item 42 in the first row 89 can be determined by the sensor 126. In the event that no case item 42 is detected in the front row 89, a signal is generated to the controller 120 to cause the hydraulic/pneumatic cylinder 114 to be operated until at least one case item 42 is shifted forwardly to the point that the sensor 126 detects the presence of a case item 42 in the front row 89.

At the point that all of the case items 42 in the front row 98 have been picked, the sensor 126 causes a signal to be generated to the controller 120 to initiate the forward advance of the pusher 110, again to the point that a case item 42 is moved into the front row 89 and detected by the sensor 126. It should be understood that a manual input to the controller 120 is contemplated, whereby the operator 16 may effect shifting of the case items 42, 44 on an ad hoc basis.

Spaced ends 136,138 on the pusher 110 are guided along rails 140,142 extending in a fore-and-aft direction between the front 76 and rear 78 of the shelf 64. With this arrangement, the pusher 110 is stably mounted and will consistently follow a rear-to-front and front-to-rear path. The mid-portion of the pusher 110 is stabilized by the cylinder 114, which is guided in fore-and-aft movement along a parallel rail 143.

Figure 9:
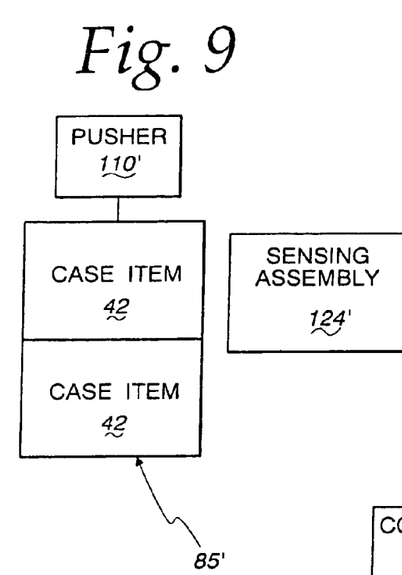
FIG. 9 is a view as in FIG. 1 of a further modified form of system for handling stocked items, according to the present invention.

It should be understood, however, as shown in FIG. 9, that the inventive concept can be used with as few as two case items 42 in a single column 85'. The sensing assembly 124' may thus detect the absence of case items 42 altogether, the presence of one case item 42 in a first specific "row" location, and the presence of two case items 42. The pusher 110' may be operative in the same manner as the pusher 110, previously described.

Figure 10:
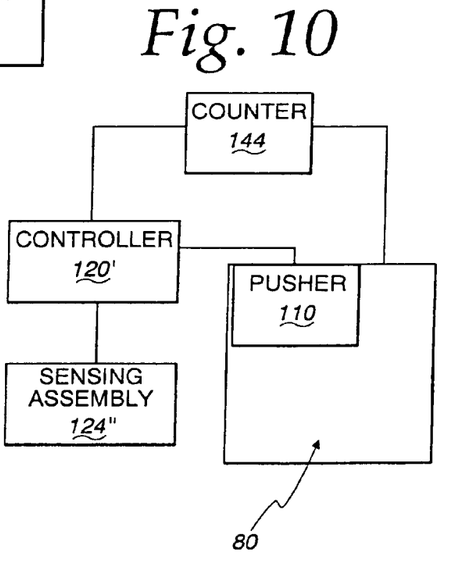
FIG. 10 is a view as in FIG. 9 of a still further modified form of system for handling stocked items, according the present invention.

As shown in FIG. 10, the invention contemplates operation of one or more pushers 110 in response to a signal generated other than by sensing the position of one or more case items 42 on the support assembly 80. More particularly, a controller 120' that is part of a sensing assembly 124", may operate the pusher(s) 110 in response to a signal that is caused to be generated by a counter 144. For example, with a single column and single layer of case items 42, the act of removing of the case item 42 from the front row may be processed by the counter 144. The operator 16 may manually input the pick, or alternatively, the pick may be detected by an appropriate sensor. This pick, upon being processed by the counter 144, will cause the controller 120' to be operated to move the case item 42 rearwardly of, and closest to, the front row, to be shifted into the front row. Of course, the system in FIG. 10 could be programmed to count picks in multi-column and multi-layer arrays of case items 42 to achieve the same end.

The invention contemplates other structures for sensing the state of the support assemblies 80, 82, 84, so long as the pushers 110 are capable of being operated to reposition case items 42 for convenient picking. Further, the operation of the pushers 110 may be in response to a manual input from an operator that may be dictated after a visual inspection of the state of the case items 42 upon the support assemblies 80, 82, 94.

The support assemblies 82,84 may be constructed in the same manner as the support assembly 80 to include two or more sensors 126'; 132'; 126",132", hydraulic/pneumatic cylinders 114', 114", etc. The controller 120 may coordinatingly operate the pushers 110 associated with each of the support assemblies 80, 82 84. Alternatively, individual and separably operable controllers and repositioning assemblies may be utilized with each support subassembly 80,82,84.

The lower shelf 66 may be constructed in the same manner as the upper shelf 64 with pushers 110 associated with corresponding support subassemblies 80',82',84' and operated through the same, or different, sensing assembly 124 and controller 120.

Figure 11:
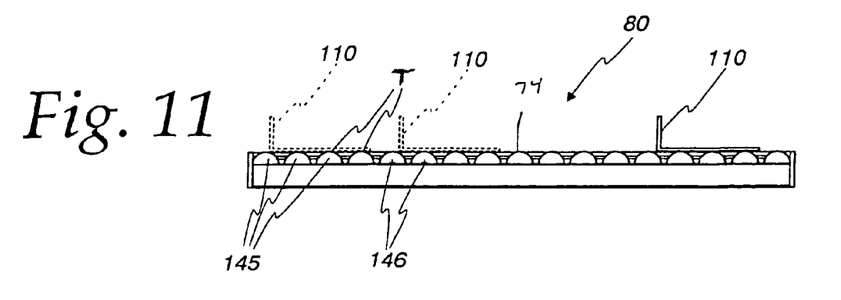
FIG. 11 is an enlarged, side elevation view of one of the support assemblies and showing rollers upon which items are guided.

The surface 74 on the first support assembly 80 may be defined by a flat planar element or sheet. Alternatively, and more preferably, as shown in FIG. 11, the surface 74 may be defined cooperatively by peripheral tangent points T on a series of rollers 145, each rotatable about parallel, laterally extending axes 146. With this arrangement, less resistance to forward movement of the case items 42 through the pushers 110 is encountered.

With the above-described structure, case items 42, associated with each of the support assemblies 80,82,84,80',82',84', are controlled so that if there is any case item 42 present at a particular support assembly 80,82,84,80',82',84', at least one such case item 42 will be located at the front row thereon.

Figure 12:
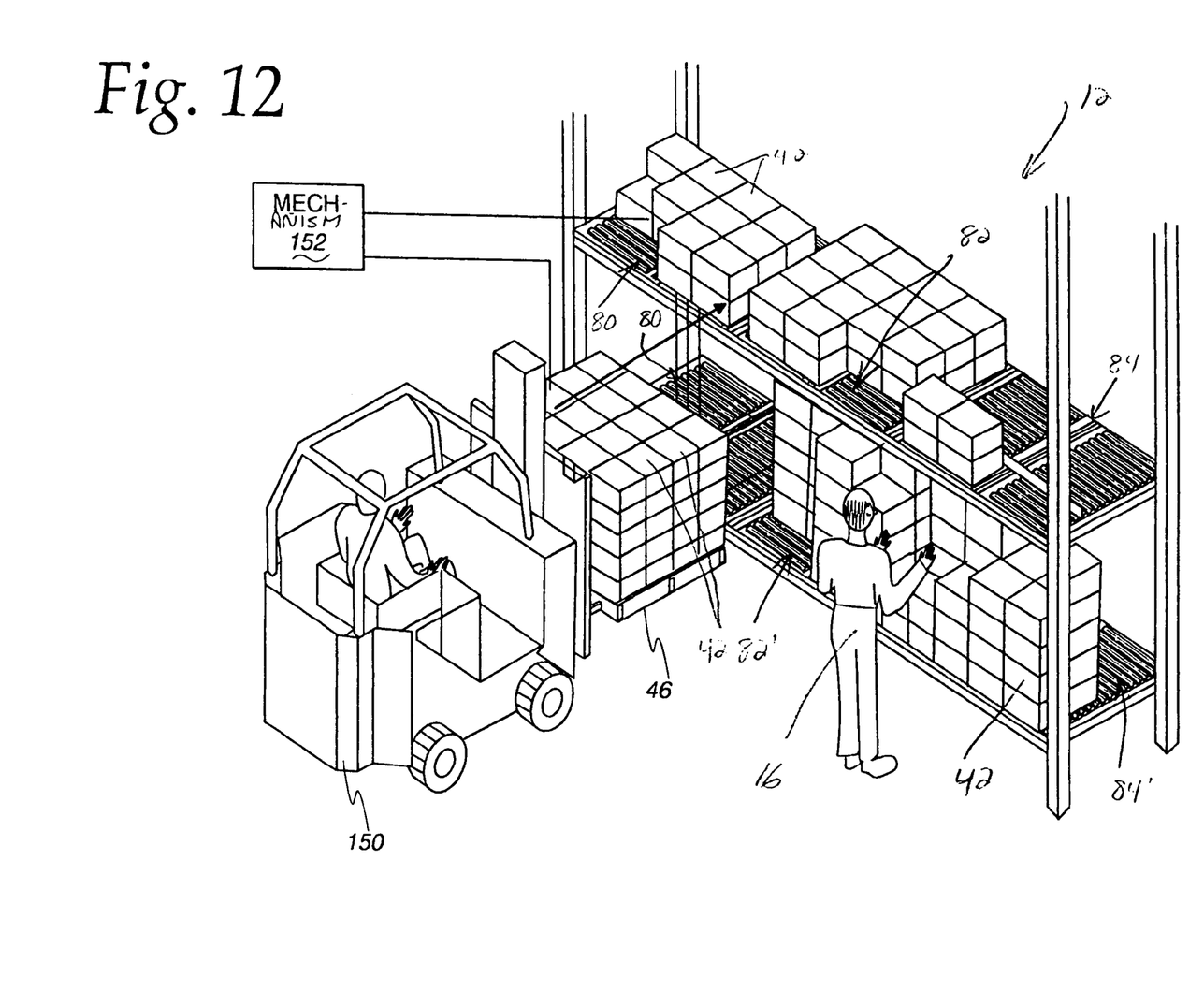
FIG. 12 is a view as in FIGS. 3 and 7 with a fork lift situated to present a supply of items for replenishment to the support assembly.

Once case items 42, 44 on a particular support subassembly 80,82,84,80',82',84' are exhausted, case items 42, 44 for that particular subassembly 80,82,84,80',82',84' can be replenished. As shown in FIG. 12 a forklift 150 can be used to deliver on a pallet 46, or alternatively on a slip sheet, a bulk supply of the case items 42 in an array that preferably corresponds to that for the particular support subassembly 80,82, 84,80',82',84'. Through an appropriate mechanism, shown at 152 and known to those skilled in this art, or manually, case items 142 on the pallet 46 carried by the forklift 150 can be separated from the pallet 46 and transferred to the particular support subassembly 80,82,84,80',82',84', to be placed directly thereon without an underlying pallet or slip sheet. Replenishment of less than a full pallet of case items 42 may be made to a particular support subassembly 80,82,84,80',82', 84' that is partially stocked through a manual process or through a programmed override, as by using the mechanism 152.

Figure 13:
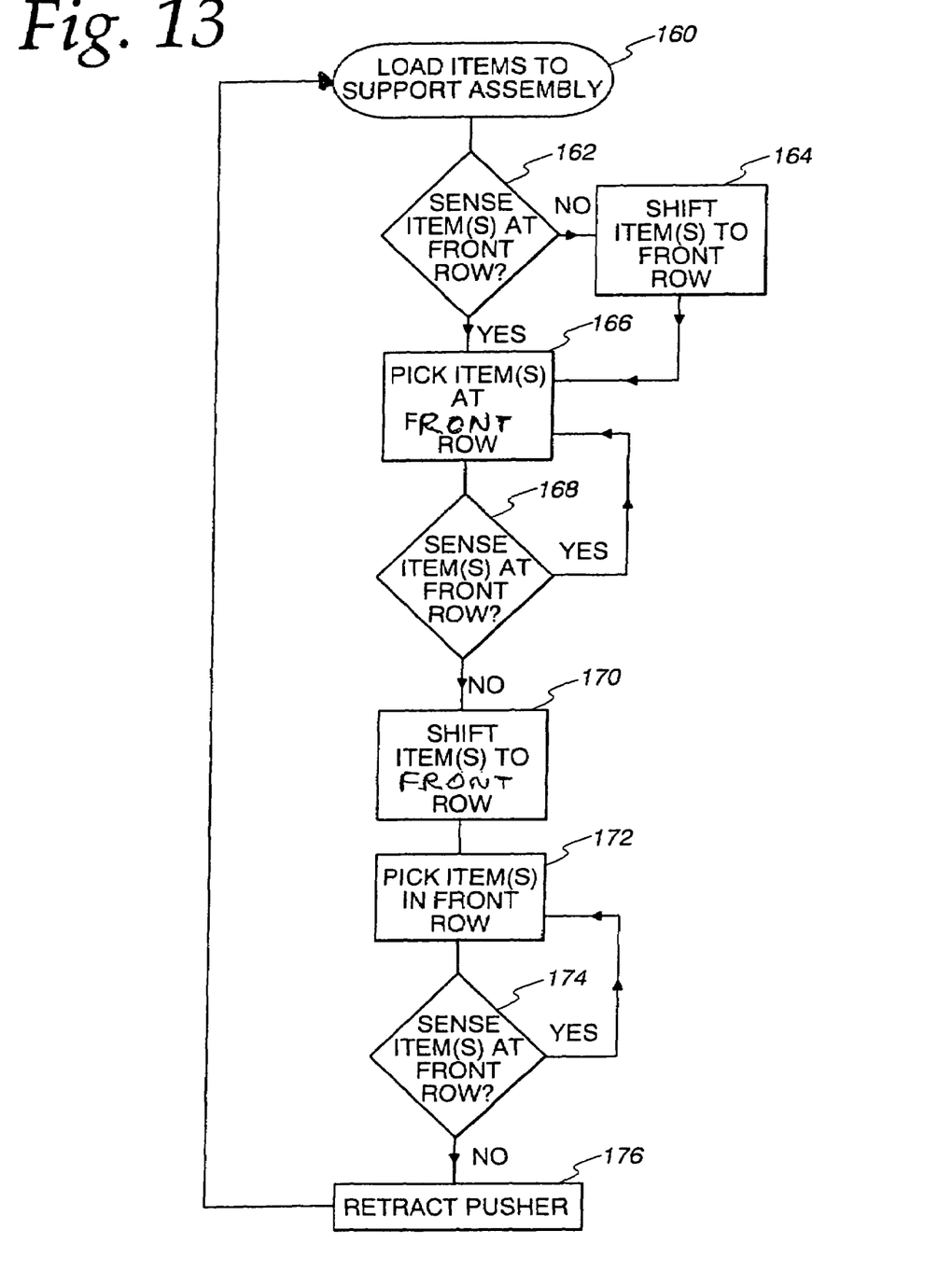
FIG. 13 is a flow diagram representation of one method of handling stocked items, as through a system as described above.

A typical operation for handling stock items, using the principles of the present invention, will now be described using an exemplary three row design, with reference to FIG. 13. At the initial step, items 42 are loaded upon the support subassembly 12, 12', 12", 12"', as shown at block 160.

At block 162, a query is made as to whether an item 42 is sensed at the front row. If the answer to the query is no, one or more items is shifted to the front row, as shown at block 164. Thereafter, the items are picked initially from the front row as shown in block 166. If the answer to the query at block 162 is yes, the items 42 can be picked at the front row without requiring shifting thereof. As shown at block 166, the items at the front row are picked until no items 42 exist at the front row. As seen at block 168, a query is made repeatedly, or after each pick, as to whether one or more items 42 remain in the front row. If items 42 are sensed in the front row, the operator continues to pick items, as shown at block 166, until no item 42 is sensed in the front row. If no item is sensed in the front row in block 168, as shown at block 170, the pusher 110 is operated to shift at least one item to the front row. At block 172, the operator picks an item or items at the front row. As this occurs, as shown at block 174, sensing of the front row continues. In the event that one or more items is sensed in the front row, the operator continues to pick without a change in the system state. In the event that no item is sensed in the front row, with the pusher 110 advanced fully forwardly, the pusher 110 is retracted to the first position, as shown at block 176. The items are replenished through reloading, as indicated at block 160.

While the invention has been described with particular reference to the drawings, it should be understood that various modifications could be made without departing from the spirit and scope of the present invention.

The invention claimed is:

1. In combination:
   a) a system for handling stocked items to be picked in a warehouse, the system comprising:
   a first support assembly having a support surface upon which a plurality of items can be placed and stored in a predetermined array, comprising a plurality of rows and at least first and second columns, and from which stored items can be picked from a first location,
   the first support assembly having at least (a) a first state with no item upon the first support assembly, (b) a second state with at least one item in at least one of the columns and at least one of the rows and no items in another of the rows, and (c) a third state with at least one item in at least one column in each of the plurality of rows;
   a repositioning assembly that is operable to cause i) an item upon the first support assembly in the first column to be shifted from a first row to a second row and ii) an item upon the first support assembly in the second column to be shifted from the first row to the second row,
   an item upon the first support assembly situated to be more accessible to an operator for picking from the first location with the item in the second row than with the item in the first row;
   a controller through which the repositioning assembly is selectively operated; and
   a sensing assembly capable of sensing at least the second state; and
   b) a plurality of items on the first support assembly including i) a first item in the first column and the first row and ii) a second item in the second column and the first row, with no items in the second row in either of the first and second columns,
   the plurality of items upon the first support assembly each having at least one surface extending upwardly from the support surface,
   the repositioning assembly comprising at least a first movable pusher,
   the sensing assembly, as an incident of sensing the second state, capable of generating a signal that is indicative of the second state to the controller that causes the repositioning assembly to be operated to thereby cause the first pusher to bear against the upwardly extending surfaces on the first and second items to cause the first and second items to be shifted simultaneously from the first row into the second row.

2. The combination according to claim 1 wherein at least a part of the first pusher resides at alt times above the support surface.

3. The combination according to claim 2 wherein the support surface is substantially flat and horizontally oriented and the first pusher comprises a pusher surface that translates along a line against the first item to cause the first item to move from the first row into the second row.

4. The combination according to claim 2 wherein the items are arranged substantially linearly in the columns in the predetermined array so that items moving in a column travel in a linear path through the plurality of rows, there are at feast two items in the first column and the first pusher engages and moves one of the two items against the other of the two items to cause the other of the two items to move between rows.

5. The combination according to claim 2 wherein items are arranged substantially linearly in the columns in the predetermined array so that items moving in the columns travel in a linear path between rows.

6. The combination according to claim 1 wherein the controller is configured to also be manually operated to cause an item to be moved from the first row into the second row through the repositioning assembly.

7. The combination according to claim 1 wherein the sensing assembly is capable of sensing the first state and as an incident of sensing the first state generating a signal that is indicative of the first state to the controller.

8. The combination according to claim 7 wherein the first pusher is movable in substantially a straight line from a first position into a second position to thereby cause the first and second items to be moved from the first row into the second row.

9. The combination according to claim 8 wherein upon the sensing assembly sensing the first state for the first support assembly, the sensing assembly generates a signal to the controller that causes the repositioning assembly to be operated to move the first pusher into its first position.

10. The combination according to claim 7 wherein with items stored to capacity in the predetermined array, an item is in a most proximal row relative to the first location and an item is in a most distal row relative to the first location, and with the sensing assembly sensing that the first support assembly is in a state wherein there is at least one item upon the first support assembly but no item in the most proximal row, the sensing assembly causes a signal to be generated to the controller to cause the repositioning assembly to be operated to thereby move an item into the most proximal row.

11. The combination according to claim 7 wherein with items stored to capacity in the predetermined array, an item is in a most proximal row relative to the first location, an item is in a most distal row relative to the first location, and at least one item is in an intermediate row between the most proximal and most distal rows, and with the sensing assembly sensing that the first support is in a state wherein there is at least one item in a first intermediate row and no item in the most proximal row, the sensing assembly causes a signal to be generated to the controller to cause the repositioning assembly to be operated to thereby move an item in the first intermediate row into the most proximal position.

12. The combination according to claim 11 wherein the item in the first intermediate row is caused to be moved from the first intermediate row into the most proximal row by at least one of (a) repositioning an item in the most distal row and (b) repositioning an item in a second intermediate row between the first intermediate row and the most distal row.

13. The combination according to claim 1 wherein the first pusher is operated by at least one hydraulic or pneumatic cylinder.

14. The combination according to claim 1 wherein the system further comprises a second support assembly adjacent to the first support assembly and upon which a plurality of items can be stored and from which items can be picked from a second location that is adjacent to the first location.

15. The combination according to claim 14 wherein the first location is above the second location.

16. The combination according to claim 14 wherein the first location is horizontally spaced from the second location.

17. The combination according to claim 14 wherein the second support assembly has substantially the same structure as the first support assembly.

18. The combination according to claim 14 wherein the first and second support assemblies cooperatively define a picking station and further in combination with an accumulation system for consolidating items picked from the first and second support assemblies.

19. The combination according to claim 18 further comprising means for identifying for an operator items to be picked from the first and second support assemblies to the accumulation system.

20. The combination according to claim 19 wherein the accumulation system comprises a conveyor.

21. A method of handling stocked items to be picked in a warehouse, the method comprising the steps of:
providing a first support assembly upon which a plurality of items can be stored in a predetermined array comprising a plurality of rows and a plurality of columns including first and second columns and from which stored items can be picked from a first location;
providing a repositioning assembly;
automatically sensing a first state for the first support assembly wherein at least a first item is in the first column in one of the rows, a second item is in the second column in the one of the rows, and no items are in another of the rows; and
as an incident of sensing the first state, causing the repositioning assembly to be operated and thereby moving each of the first and second items from the one row into the another row,
the first and second items situated to be more accessible to an operator for picking from the first location with each of the first and second items in the another row than with the first and second items in the one row,
wherein the step of providing a repositioning assembly comprises providing a repositioning assembly comprising a pusher assembly,
wherein the first support assembly has a support surface upon which the plurality of items can be placed and stored,
wherein the step of operating the repositioning assembly comprises operating the repositioning assembly to cause a pusher surface on the pusher assembly to bear simultaneously against surfaces on the first and second items extending upwardly from the support surface with the first and second items stored on the first support assembly and thereby move the first and second items upon the first support assembly.

22. The method of handling stocked items to be picked in a warehouse according to claim 21 wherein the step of causing the pusher surface to bear against surfaces on the first and second items and move the first and second items comprises the step of causing the pusher surface to bear against the surface on the first item in one row in the first column to cause the first item to bear against a second item in a second row in the first column and thereby move the second item to a third row in the first column.

23. The method of handling stocked items to be picked in a warehouse according to claim 22 wherein the pusher assembly is hydraulically or pneumatically operated.

24. The method of handling stocked items to be picked in a warehouse according to claim 21 wherein items are arranged substantially linearly in columns in the predetermined array so that items moving in the first and second columns travel in a linear path between rows.

* * * * *